United States Patent
Dussourd et al.

[15] 3,696,588
[45] Oct. 10, 1972

[54] GAS DRYING APPARATUS AND METHOD

[72] Inventors: Jules L. Dussourd; Ronald L. Haugen, both of Princeton, N.J.

[73] Assignee: Ingersoll-Rand Company, New York, N.Y.

[22] Filed: Dec. 7, 1970

[21] Appl. No.: 95,603

[52] U.S. Cl. ................................. 55/163, 55/189
[51] Int. Cl. ................................................ B01d 53/04
[58] Field of Search........ 55/21, 33, 58, 163, 189, 190

[56] References Cited

UNITED STATES PATENTS

| | | | |
|---|---|---|---|
| 3,164,454 | 1/1965 | Wilson | 55/58 X |
| 3,225,518 | 12/1965 | Skarstrom et al. | 55/58 X |
| 3,279,151 | 10/1966 | Kauer, Jr. et al. | 55/58 X |
| 3,395,511 | 8/1968 | Akerman | 55/58 X |
| 3,399,510 | 9/1968 | Kauer, Jr. et al. | 55/33 |
| 3,176,444 | 4/1965 | Kironaga | 55/58 X |
| 3,498,025 | 3/1970 | Bednarski | 55/58 X |
| 3,080,693 | 3/1963 | Glass et al. | 55/33 X |
| 3,182,435 | 5/1965 | Axt | 55/33 X |
| 3,192,686 | 7/1965 | Berkey et al. | 55/33 X |

*Primary Examiner*—John Adee
*Attorney*—Frank S. Troidl, David W. Tibbott and Bernard J. Murphy

[57] ABSTRACT

The apparatus comprises a desiccant chamber, operatively disposed between a gas compressor and a receiver, through which a gas to be dried therein is conducted, and valving for depressurizing the chamber and venting the same to atmosphere, when the receiver is fully charged. A pressure-sensing element automatically operates the valving. The apparatus has means insuring a valved return to a receiver-charging condition or operational mode automatically following apparatus shut down. The method sets forth the steps of chamber-drying the gas, monitoring the chamber-charged condition, shunting gas away from the receiver thereafter, and depressurizing and venting of the chamber.

7 Claims, 4 Drawing Figures

INVENTORS
JULES L. DUSSOURD
RONALD L. HAUGEN
BY
Bernard J. Murphy
AGENT

INVENTORS
JULES L. DUSSOURD
RONALD L. HAUGEN
BY
Bernard J. Murphy
AGENT

GAS DRYING APPARATUS AND METHOD

This invention pertains to gas drying apparatus and methods, and in particular to gas drying apparatus and methods for gas compressor and compressed gas receiver systems, such as those used on vehicles for operation of pneumatic brakes.

In most pneumatic braking systems used on trucks, and other vehicles, no attempt is made to dry the air. Problems result therefrom, due to moisture accumulation, freezing in wintertime, etc.

These conditions have resulted in recent efforts to generate and provide apparatus and methods for removing the moisture. A number of patents have been granted, describing specific schemes using regenerated desiccant dryer systems. These schemes attempt to achieve a combination of characteristics desirable for such applications. Among them are reliability, simplicity and low initial cost, compliance with federal and state ordinances, ease of maintenance, adaptability onto existing compressed air systems with a minimum of modifications, etc.

It is desirable for safety reasons not to take away from the output of the compressor of a gas system while the compressor is charging the storage tank or receiver, for the purpose of purging a desiccant chamber, for instance. That is, the compressed gas (air) system must retain its full reserve capability to operate the brakes of the truck at all times. It is even more desirable to insure that none of the dried gas supply placed in storage for availability to the brakes is wasted. A failure to provide these features is a weakness of prior systems.

Drying systems have charging and regeneration or reactivation modes and, for vehicle use, it is desirable that the system or apparatus be switched over to the "charging mode" following shut down. It is possible for a valve, under freezing conditions, to be stuck in the "regeneration mode" with shut down, frustrating a pumping up of the receiver tank with the next use of the system. With a system having an apparatus automatically switched to a "charging mode" following shut down, a full charging of the receiver tank, toward subsequent, safe operation of the vehicle, can be assured.

It is an object of this invention to teach gas drying apparatus and methods which provide the afore-mentioned features not now known in or afforded by the prior art.

It is another object of this invention to teach a gas drying apparatus, for a gas system having a gas compressor and gas receiver means, which comprises a dual-ended desiccant chamber; piping means throughconnecting said chamber with said compressor and said receiver means; said piping means including valving means operative in one mode, of plurality of modes, to cause a conduct of gas through said chamber from one end to the other end thereof, for the drying of said gas therewithin, and to conduct dried gas therefrom to said receiver means for storage, and operative in another mode of the plurality thereof to vent said one end of said chamber to the atmosphere; and pressure-sensing means, throughconnected with said receiver means and said valving means, operative in response to a first, given gas pressure subsisting in said receiver means to change operation of said valving means from said one operative mode to said another operative mode, and operative in response to a second, given gas pressure subsisting in said receiver means to change operation of said valving means from said another mode to said one mode; wherein said pressure-sensing means includes means automatically operative to shunt dried gas away from said receiver means, at least upon receiver means having achieved a given, full charge of dried, compressed gas product therewithin, and effective, automatically, upon sensing an attenuation of gas pressure in said receiver means which establishes said second given gas pressure in said receiver means, to cause a change of said valving means for operation thereof in said one mode, at least during initial, start-up of the apparatus, following any apparatus shut-down.

It is another object of this invention to teach a method of drying gas which comprises the steps of conducting gas to be dried through a dual-ended desiccant chamber; conducting the chamber-dried gas to a receiver; monitoring the receiver gas-product condition; and shunting dried gas away from the receiver upon the latter having received a given full charge of dried gas product; and then venting said chamber to the atmosphere to reactivate chamber desiccant; wherein said venting step comprises depressurizing said chamber.

A feature of this invention comprises a desiccant chamber, operatively disposed between a gas compressor and a receiver, through which a gas to be dried therein is conducted, and valving for depressurizing the chamber and venting the same to atmosphere, when the receiver is fully charged. A pressure-sensing element automatically operates the valving. The apparatus has means insuring a valved return to a receiver-charging condition or operational mode automatically following apparatus shut down. The method sets forth the steps of chamber-drying the gas, monitoring the chamber-charged condition, shunting gas away from the receiver thereafter, and depressurizing and venting of the chamber.

Further objects and features of this invention will become more apparent by reference to the following description taken in conjunction with the accompanying figures in which.

Figure 3:
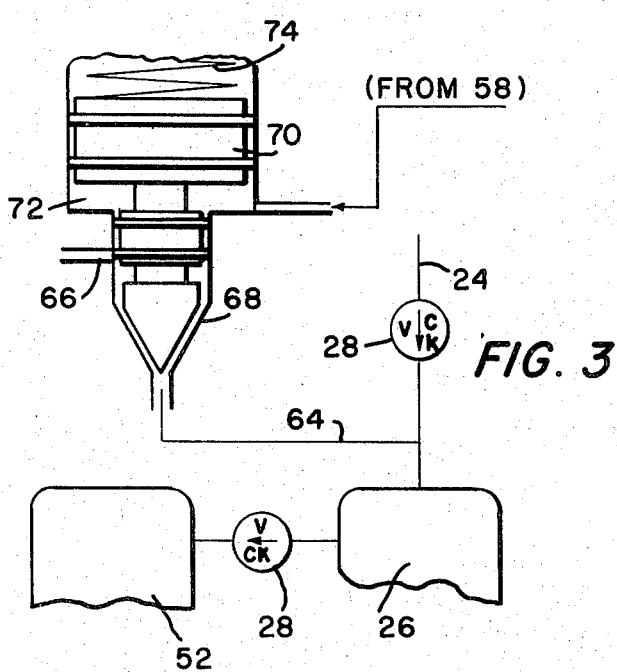
Figure 2:
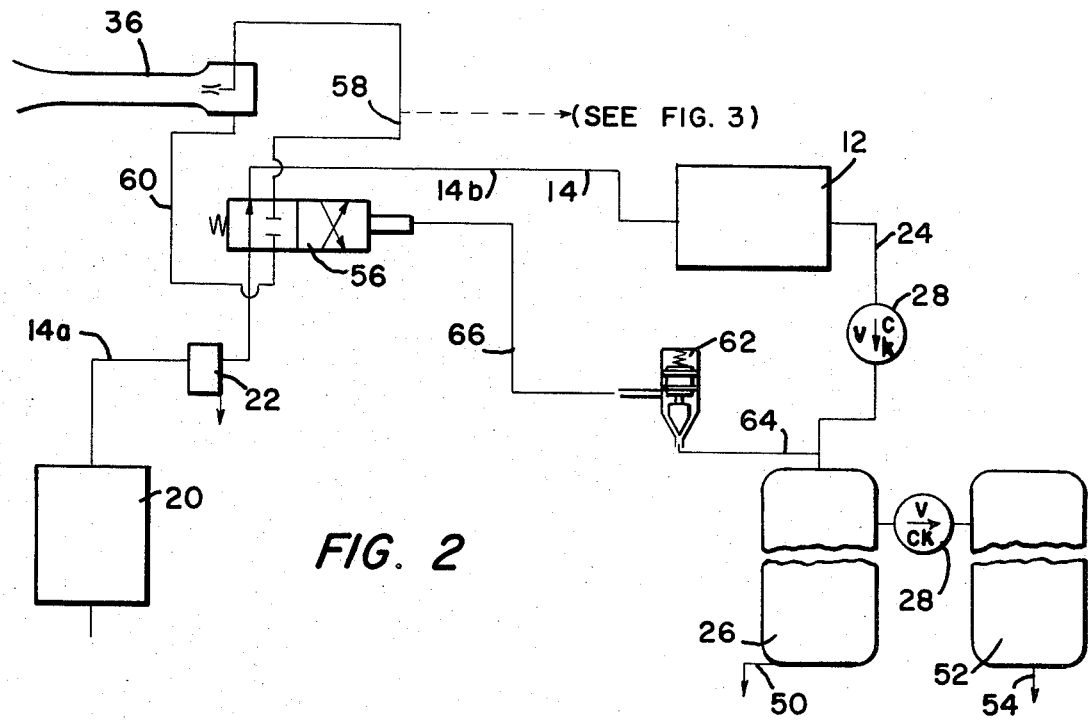
FIG. 2 is a schematic diagram of an alternate embodiment of a novel gas drying apparatus incorporating a single valve for switching of the operational modes, with a trigger valve serving as the pressure-sensing device.
Figure 4:
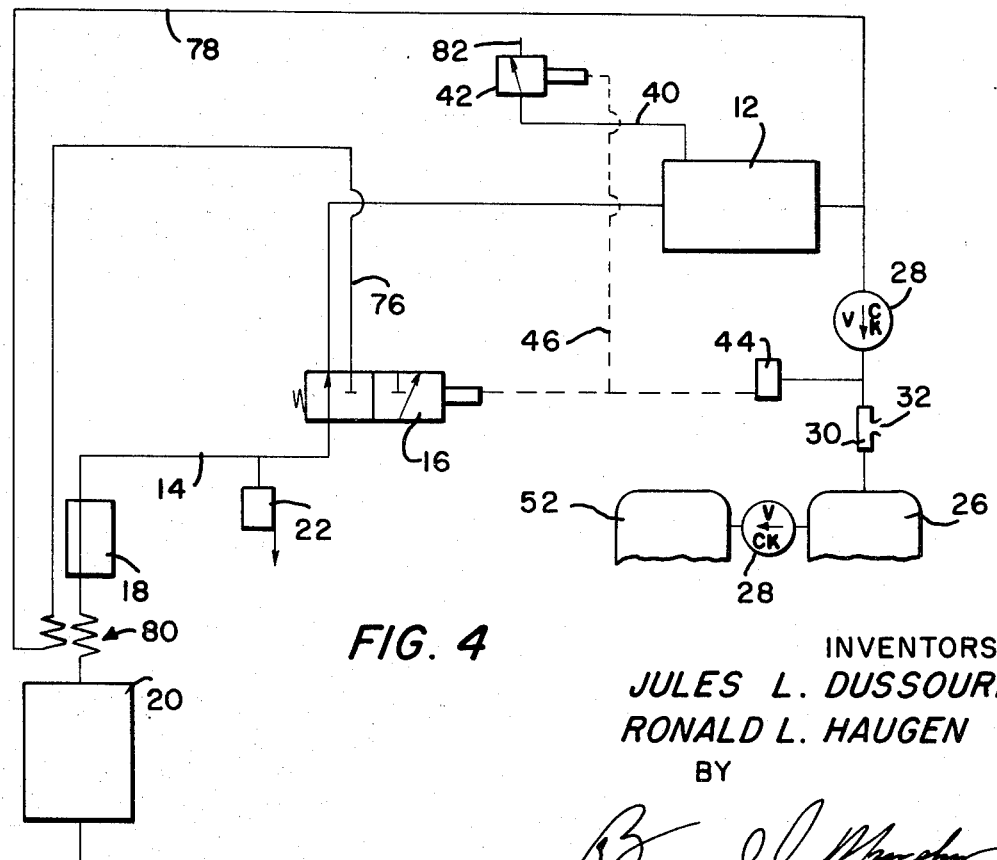

FIG. 3 illustrates an alternate embodiment of a trigger valve, a novelly modified trigger valve, which is usable in the system of FIG. 2 in lieu of the trigger valve there shown; and FIG. 4 is a schematic diagram of still a further embodiment of an inventive gas drying apparatus which incorporates heat exchanger means for heating the "-purge gas" to enhance the reactivation of the desiccant thereby.

Figure 1:
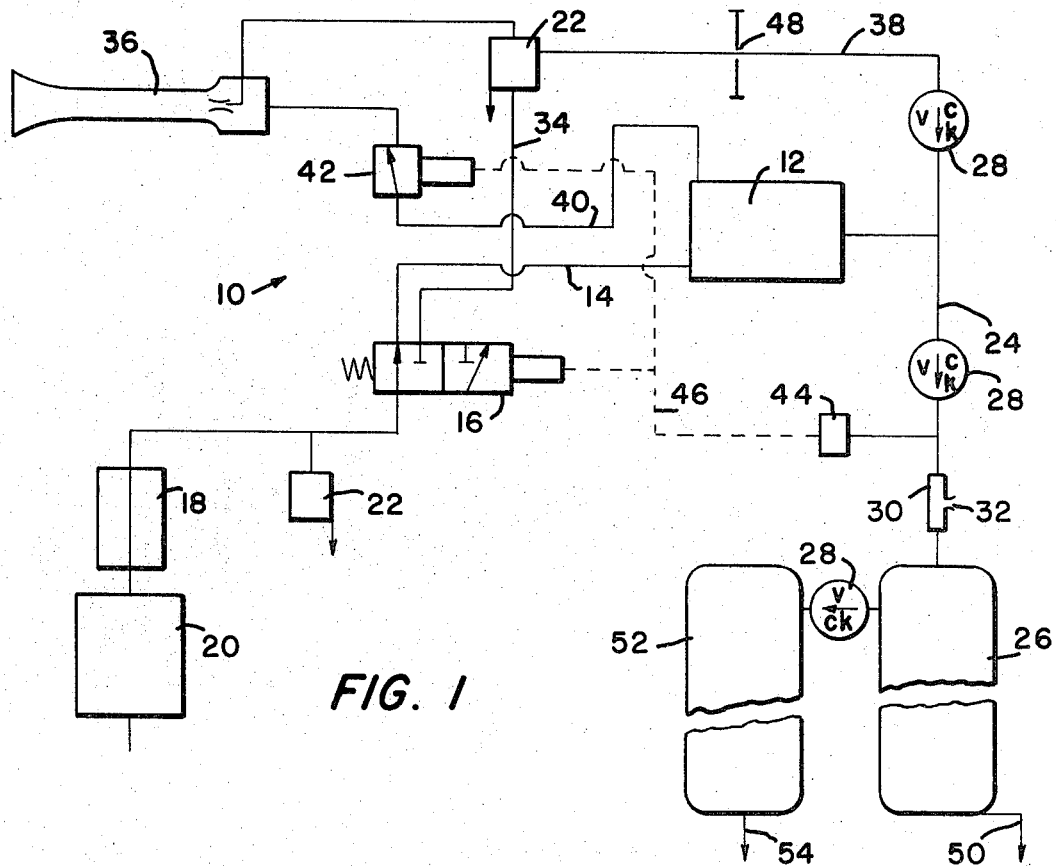
FIG. 1 is a schematic diagram of an embodiment of a gas drying apparatus for a gas system, according to the invention, incorporating two valves synchronously operative by a tank receiver pressure-sensing means to switch between reactivation and charging modes of operation, there further being a bleed orifice in significant use therewith.

As shown in FIG. 1, the first embodiment of the apparatus 10 comprises a desiccant chamber 12 to which a gas input line 14 is throughconnected, at one end thereof by means of a two-way valve 16. Line 14 proceeds to valve 16 from an optionally-included cooler 18 and gas compressor 20. Optionally, a liquid trap 22 is disposed in line 14. A gas product line 24 is coupled to and opens on the opposite, other end of chamber 12 and throughconnects with a wet tank receiver 26 by way of a check valve 28 and coupling 30. Coupling 30 has formed therein a bleed orifice 32, the significant, inventive purpose of which is explained in the ensuing text. A vent line 34 is throughconnected with the valve 16 at one end thereof and an ejector 36 at the other end thereof, line 34 being provided to conduct ejector-operating gas therethrough. A branch "purge gas" line 38 proceeds from a throughconnection with an intermediate portion of line 34, and a liquid trap 22, and is throughconnected with line 24 to provide access therefor into chamber 12. Another check valve 28 is interposed in line 38. A vacuum or depressurizing line 40 interconnects the one end of chamber 12 with the ejector 36 by way of an on-off valve 42. On-off valve 42 is normally closed, and requires actuation thereof to permit a conduct or evacuation of gas through line 40 to ejector 36. A pressure-sensing switch 44 is coupled to open onto line 24 for monitoring the pressure condition of tank receiver 26 and has mechanical linkage 46 coupled thereto, and also to valves 42 and 16, to cause simultaneous actuation of the latter.

Generally, the apparatus 10 as shown, and specifically in the positioning of the valves as illustrated, will charge tank receiver 26 by the conduct of compressed gas through valve 16, via line 14, desiccant chamber 12, and line 24. However, when tank receiver 26 is fully charged, switch 44 will actuate valves 16 and 42 to dispose both in their alternate operational positions. Thereupon, line 14 will be interrupted and the gas compressor output will be connected directly with line 34 to initiate operation of the ejector 36. Also, on-off valve 42 will conduct gas therethrough, the same proceeding from branch, "purge gas" line 38 through chamber 12 and line 40. This conduct of a branch, purge gas portion of the compressor output reactivates the desiccant in chamber 12, line 40 and ejector 46 being cooperative to depressurize the chamber.

Orifice 48 is interposed in line 38 to cooperate with the orifice in ejector 36; e.g., approximately 10 percent of the gas flow proceeds through line 38 and the 90 percent passes through the ejector; both orifices are dimensioned to accomplish this. A water drain 50 is coupled to tank receiver 26 for draining residual moisture from this, the wet tank. Another check valve 28 interconnects wet tank 26 with a dry tank receiver 52; it is from this latter tank that a product out line 54 proceeds, providing air supply to vehicle brakes, or for whatever use is to be made of the product.

According to our teaching of a novel apparatus, as embodied in FIG. 1, by way of example, the system stored supply of compressed gas for pneumatic braking, or whatever, is never dissipated for use to reactivate the chamber 12. In fact, it is only when both tank receivers 26 and 52 are fully charged that pressure switch 44 changes the valving to effect a reactivation mode of the apparatus.

A particularly novel and significant feature of our invention is set forth in the orifice 32 which continuously bleeds wet tank 26. Accordingly, when the vehicle is shut down for a period of time, tank 26 is gradually bled off and depressurized until it reaches that pressure at which pressure switch 44 becomes operative to return the valving to the "charging mode" (as illustrated). Switch 44, then, disposes the valving in the reactivating or purging mode of operation when tank receiver 26 has a pressure therein of some given value, and switch 44 releases the valving, i.e., allows valves 16 and 42 to assume the FIG. 1 dispositions, when tank receiver 26 has a pressure therein of some value other and less than said given value. Thus, even if tank receiver 26 is fully charged at shut-down, the apparatus 10 will switch to a "charging mode" when the receiver tank 26 has bled down to the lesser pressure.

FIG. 2 illustrates an alternate embodiment of our invention which is largely similar to that depicted in FIG. 1 except that, in this embodiment, a single three-way valve 56 is used (in place of the two valves 42 and 16 of the FIG. 1 embodiment). Also, now a vent line 58 (similar to line 34 of the FIG. 1 apparatus) taps off between first and second portions, 14a and 14b, of the gas input line 14, to operate the ejector 36 during the regeneration mode. Too, a vacuum line 60 is connected through valve 56 to evacuate chamber 12 during the regeneration mode. It will be noted that, according to this embodiment, only a vacuum is pulled on chamber 12. There is no requirement to conduct gas through chamber 12, via both ends thereof, to reactivate the desiccant. In fact, during the reactivation mode, the check valve 28 in line 24 closes the one end of chamber 12 threat, and evacuation thereof proceeds only by way of line portion 14b, line 60, and ejector 36. Also, in this embodiment, we teach the use of a spring-loaded trigger valve 62 (in lieu of the pressure-sensing switch 44 of the FIG. 1 embodiment). Valve 62 is throughconnected with line 24 and valve 56 by way of first and second pilot fluid lines 64 and 66. When tank receiver 26 is fully charged with compressed gas product, valve 62 opens to conduct pilot fluid therethrough; this pilot fluid, in turn, operates valve 56 to start the regeneration, i.e., the vacuum drying of chamber 12.

Valve 62, a standard, commercial type of device, presents a restricted bearing surface, in its movable valving member, to the pilot fluid addressed thereto by line 64. Therefore, it requires a fluid pressure of some given value to overcome the spring bias and opens the valve. Once the valve is opened, the valving member presents a broad bearing surface to the fluid. In order for the valve to close again, in response to the spring bias, the pilot fluid pressure must become attenuated. Regeneration continues, then, until fluid pressure in wet tank receiver 26 is considerably reduced by leakage, or end item use (i.e., air brakes). Subsequently, then, with the system in operation of the gas compressor 20, or at halt, valve 62 closes again, automatically, to dispose the novel apparatus in a charging mode. In this embodiment of our invention, there is no wastage of any compressed gas product. Substantially all of the product—save for a minor "pilot" component thereof—which is charged into both tank receivers 26 and 52, is retained for end item use.

In FIG. 3 is illustrated an alternate embodiment of a trigger valve, the same being similar, in some respects, to valve 62 shown in FIG. 2. The modified trigger valve 68 incorporates the features of valve 62 but, in addition, has an enlarged piston head 70 which operates in a variable volume chamber 72 against the bias of spring 74. It is our teaching with this modified trigger valve 68 to introduce compressed gas from line 58 (see FIG. 2) to the chamber 72 to assist in holding opening valve 68. Therefore, when the system is shut down, as when the vehicle ceases operation and the compressor 20 comes to halt, line 58 can no longer supply a fluid assist for a sustained displacement of piston head 70. Therefore, spring 74 quickly disposes valve 68 in its closed position; this provides immediate set-up of the system for receiver "charging" operation following shut-down.

The further embodiment of a novel gas drying apparatus presented in FIG. 4 is very much similar to the system illustrated in FIG. 1 except that, in this embodiment, the "purge" or reactivation gas is heated prior to its conduct through chamber 12. In this embodiment, first and second heat lines 76 and 78 conduct gas through a heat exchanger 80, formed in part of the juncture of lines 76 and 78, and formed in part of one end of line 14, so that the "purge" gas might benefit from the heat of the compressed gas product to accelerate reactivation of the desiccant. Again, an on-off valve 42 is used to exhaust the purge gas, by way of line 40 to exhaust line 82, upon actuation of both valves 42 and 16 by pressure-sensing switch 44.

Our disclosure teaches a novel method of drying gas which, as those skilled in this art will appreciate, can be practiced by apparatus embodiments other than those presented here. Of course, such other embodiments take teaching from our inventive method, the latter comprising the steps of conducting gas to be dried through a dual-ended desiccant chamber; conducting the chamber-dried gas to a receiver; monitoring the receiver gas-product condition; and shunting dried gas away from the receiver upon the latter having received a given full charge of dried gas product; and then venting said chamber to the atmosphere, to reactivate chamber desiccant; wherein said venting step comprises depressurizing said chamber. As to our gas drying method, it will be noted that the procedural step of depressurizing the chamber contemplates closing off only one end of said chamber; creating a partial vacuum in said chamber; and evacuating gas from said chamber via only the other end thereof.

While we have described our invention in connection with specific embodiments thereof, and methods for the practice thereof, it is to be clearly understood that this is done only by way of example and not as a limitation to the scope of our invention as set forth in the objects thereof and in the accompanying claims.

We claim:

1. For a gas system having a gas compressor and compressed gas receiver, gas drying apparatus, comprising:

a single dual-ended desiccant chamber;
   a first conduit coupled to one end of said single chamber for admitting compressed gas from the compressor to said single chamber for drying;
   a second conduit coupled to the other end of said single chamber for conducting compressed gas from said single chamber to said receiver for storage;
   a third conduit coupled at one terminal end thereof to said one end of said single chamber, and opening onto the atmosphere at the opposite terminal end thereof, for venting of said single chamber;
   fluid-powered vacuum means operatively coupled to said third conduit for assisting said third conduit in venting of said single chamber;
   valving means operatively interposed in said first and third conduits for opening and closing said first and third conduits to the conduct of gas therethrough, said valving means normally holding said first conduit open and said third conduit closed, and having operable passageway means automatically operative upon closing of said first conduit for admitting powering fluid to said venting-assisting means; and
   means coupled to said valving means and to said second conduit for sensing gas back pressure and operative of said valving means, upon sensing a predetermined back pressure, for closing said first conduit and opening said third conduit; wherein
   said passageway means comprises a valve section normally closed, and opening automatically upon closure of said first conduit, and a first line thereconnected with said section for conducting fluid therethrough to said venting-assisting means;
   and said valve section is coupled to said first conduit for admitting compressed gas therethrough directly from the compressor to said venting-assisting means, via said first line, to enable said venting-assisting means to create a partial vacuum in said single chamber.

2. Apparatus, according to claim 1, wherein:
   said venting-assisting means comprises an ejector;
   said first line is coupled to said ejector to enable operation thereof; and
   said third conduit is coupled to said ejector to cause evacuation of said single chamber, upon said third conduit being opened by said valving means.

3. Apparatus, according to claim 2, further including:
   a fourth conduit throughconnecting said other end of said single chamber with said first line for admitting gas from said compressor into said single chamber for purging thereof.

4. Apparatus, according to claim 3, further including:
   a restrictive orifice interposed in said fourth conduit to restrict the quantity of gas admitted to said fourth conduit.

5. Apparatus, according to claim 4, further including:
   a bleed orifice in said second conduit operative for depressurizing the receiver.

6. Apparatus, according to claim 3, wherein:
   said pressure sensing means comprises a trigger valve.

7. Apparatus, according to claim 5, wherein:
   said trigger valve has a piston chamber, an enlarged piston head movable within said piston chamber for opening and closing of said trigger valve, and means biasing said piston head in valve-closure position; and further including
   a second line communicating said piston chamber with said first line for admitting the compressed gas from the compressor to said piston chamber to overcome said biasing means and move said piston head to a valve-opening position.

* * * * *